FLIP FLIP CIRCUITS UTILIZING SET-RESET DOMINATE TECHNIQUES

Filed June 14, 1963

INVENTOR.
LeRoy F. Valentine
BY John V. Regan
Attorney

United States Patent Office 3,310,686
Patented Mar. 21, 1967

3,310,686
FLIP FLIP CIRCUITS UTILIZING SET-RESET DOMINATE TECHNIQUES

Le Roy F. Valentine, Arlington, Mass., assignor to Radio Corporation of America, a corporation of Delaware
Filed June 14, 1963, Ser. No. 288,007
5 Claims. (Cl. 307—88.5)

Figure 1:
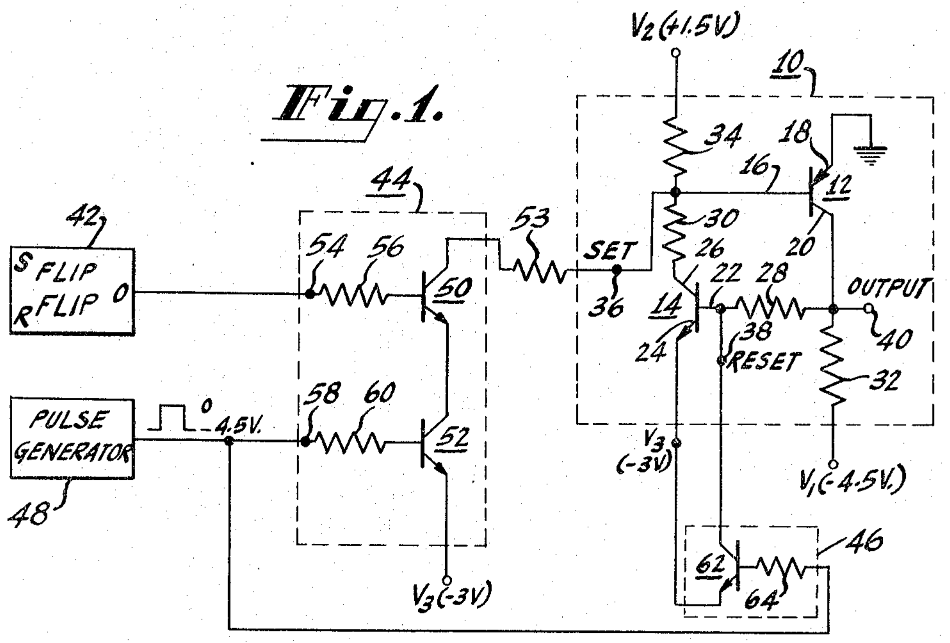

This invention relates to bistable transistor circuits, and more particularly to their use in logic circuits.

A commonly used bistable logic circuit element is a transistor flip flop. Flip flops normally include two transistors, of the same conductivity type, which are interconnected in a manner to exhibit two electrically stable states. In the first stable state, one transistor is conductive while the other is nonconductive. In the second stable state, the said one transistor is nonconductive while the other transistor is conductive. Therefore, in each stable state one transistor is conducting and a flip flop constantly consumes power even though it may be merely operating in a standby condition. Such power consumption is wasteful and increases the cost of the circuits in which flip flops are utilized.

Another bistable circuit is a transistor flip flip. A flip flip comprises a pair of transistors, of opposite conductivity type, which are interconnected in a manner to exhibit two stable states. In one stable state, both of the transistors are conductive, while in the other stable state, neither is conductive. Thus, in one stable state, the nonconductive state, a flip flip consumes no power at all. This results in a considerable saving of power as compared to a flip flop. However, no output signal is produced when a flip flip is in its nonconductive stable state. The difficulty encountered in transferring information data due to the absence of such an output signal has heretofore prevented an extensive use of flip flips in logic circuits.

Accordingly, it is an object of this invention to provide a new and improved bistable transistor logic circuit element.

In accordance with the invention, a bistable flip flip circuit includes first and second transistors of opposite conductivity type with each including input, output, and common electrodes. The transistors are cross coupled to each other by coupling the output electrode of each transistor to the input electrode of the other transistor and means are provided for biasing both transistors to a normally nonconductive state. Set and reset terminals and a single output terminal are connected to the bistable flip flip circuit and the simultaneous application of set and reset pulses causes one of these pulses to predominate over the other.

In one embodiment of the invention, a bistable flip flip is arranged in a set dominate mode of operation wherein the simultaneous application of set and reset pulses from the same pulse source causes the set pulse to predominate to render both transistors of the flip flip conductive, or set. In another embodiment of the invention, a bistable flip flip is arranged in a reset dominate mode wherein the simultaneous application of set and reset pulses from the same pulse source causes the reset pulse to predominate to render both transistors nonconductive, or reset. In both embodiments, the cross coupling and biasing means cooperate to maintain both transistors conductive when the flip flip is set and both transistors nonconductive when the flip flip is reset.

It is another object of this invention to provide a novel bistable flip flip having set and reset input terminals and an output terminal.

It is still another object of this invention to provide a novel bistable flip flip which may be set and reset by the same pulse source.

When a bistable flip flip embodying the invention is utilized as a logic circuit element, the dominant pulse is coupled to the dominant terminal (set or reset) of the flip flip via a coincidence gate, while the nondominant pulse is coupled to the nondominant terminal ungated. The other input to the coincidence gate may, for example, comprise the output from a previous flip flip stage. The coincidence gate is enabled if the previous flip flip is set and therefore both the dominant and nondominant pulses are applied simultaneously to the second flip flip stage. If the previous flip flip is reset, the coincidence gate is blocked and only the nondominant pulse is applied to the second flip flip stage. When the second stage flip flip is operated in the set dominate mode, the information stored in the previous flip flip stage will be transferred thereto without change. When the second stage flip flip is operated in the reset dominate mode, the information stored in the previous flip flip stage will be transferred to the second stage flip flip but in an inverted form.

Figure 2:
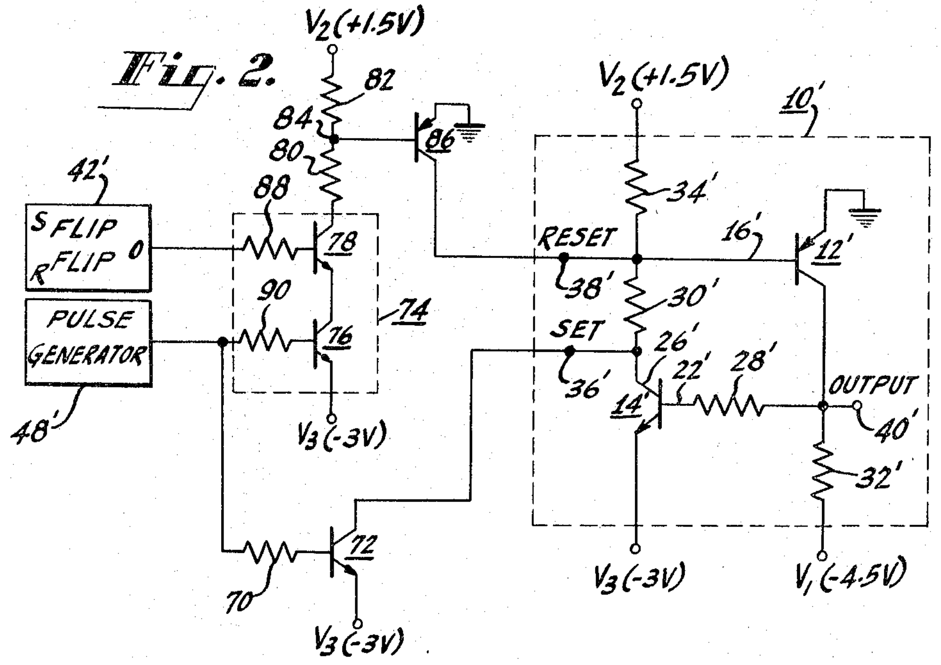

In the accompanying drawing:

FIGURE 1 is a schematic circuit diagram of a logic circuit including a bistable transistor flip flip circuit operated in the set dominate mode; and FIGURE 2 is a schematic circuit diagram of a logic circuit including a bistable transistor flip flip circuit operated in the reset dominate mode.

Referring now to FIGURE 1, a logic circuit includes a flip flip 10. The flip flip 10 includes first and second transistors 12 and 14 of opposite conductivity types. The first transistor 12, which is illustrated as a PNP type, includes an input or base electrode 16, a common or emitter electrode 18, and an output or collector electrode 20. The second transistor 14, which is shown as an NPN type, also includes base 22, emitter 24, and collector 26 electrodes. The transistors 12 and 14 are cross coupled by connecting the collector 20 of the first transistor 12 to the base 22 of the second transistor 14 through a base current limiting resistor 28 and by connecting the collector 26 of the second transistor 14 to the base 16 of the first transistor 12 through a base current limiting resistor 30. The emitter 18 of the first transistor 12 is coupled to a point of reference potential, or ground, in the circuit while the collector 20 thereof is coupled through a load resistor 32 to a source of negative potential $V_1$, which may, for example, be —4.5 volts. The collector 26 of the second transistor 14 is coupled through the resistor 30 as well as through a load resistor 34 to a source of positive potential $V_2$, which may, for example, be +1.5 volts. The emitter 24 of the second transistor 14 is directly coupled to a source of negative potential $V_3$, which may, for example be —3 volts. The flip flip 10 is therefore biased to be normally nonconductive.

The flip flip 10 includes a set terminal 36 which is coupled directly to the base 16 of the transistor 12. The flip flip 10 also includes a reset terminal 38 which is coupled directly to the base 22 of the second transistor 14. An output terminal 40 is coupled directly to the collector 20 of the first transistor 12.

Thus, a flip flip includes set and reset terminals like a flip flop, but, unlike a flip flop, requires only one output terminal. When both the transistors of a flip flip are conducting, an output signal of one level is produced at the output terminal thereof whereas when neither is conductive, the output terminal assumes a different level. In the flip flip 10 of FIGURE 1, the output terminal 40 is at ground potential when both transistors are conducting (set) and at a lower potential level (—4.5 v.) when neither is conducting (reset). A ground potential level may, for example, denote a binary "1" and the lower level (—4.5 v.) may denote a binary "0."

In the circuit of FIGURE 1, information contained in a previous stage flip flip 42 is to be transferred to the flip flip 10. The flip flip 42 includes set (S) and reset (R) input terminals which correspond, respectively, to the terminals 36 and 38 of the flip flip 10, and an output terminal (O) which corresponds to the output terminal 40 of the flip flip 10. The flip flip 42 may be identical in all respects to the flip flip 10.

Information stored in the flip flip 42 is transferred to the flip flip 10 with the aid of a coincidence gate 44, an inverter 46, and a source of clock pulses or pulse generator 48. The coincidence gate 44 includes a pair of NPN transistors 50 and 52 having their collector-emitter current paths connected in series. The collector of the transistor 50 is coupled through a resistor 52 to the set input terminal 36 of the flip flip 10 while the emitter of the transistor 52 is connected to the source of negative potential $V_3$ (−3 volts). The output terminal (O) of the flip flip 42 is coupled to one input terminal 54 of the gate 44 to apply output signals from the flip flip 42 to the base of the emitter 50 through a current limiting resistor 56. Similarly, the pulse generator 48 is coupled to the other input terminal 58 of the gate 44 to apply pulses to the base of the transistor 52 through a current limiting resistor 60. The coincidence gate 44 produces an output signal only when input signals are simultaneously applied to both the input terminals 54 and 58 thereof. The pulses from the generator 48 are shown in FIGURE 1 as having an amplitude which increases from $V_1$ (−4.5) to ground potential. Thus, two ground potential signals activate the coincidence gate 44.

The pulse generator 48 simultaneously applies pulses to the reset terminal 38 of the flip flip 10 through the inverter 46. The inverter 46 comprises an NPN transistor 62 having its base coupled through a current limiting resistor 64 to the output of the pulse generator 48. The collector of the inverter transistor 62 is directly coupled to the reset terminal 38 of the flip flip 10 while the emitter of this transistor is directly coupled to the source of negative potential $V_3$ (−3 volts). The flip flips 42 and 10 may, for example, comprise two stages of a register.

In transferring information from the first stage flip flip 42 to the second stage flip flip 10 there are four possible initial operating conditions, i.e., both flip flips are reset, both are set, one is set and the other reset. In the following description, it will be assumed that initially the flip flip 42 is in its conductive state or set and the flip flip 10 is in its nonconductive state or reset. Consequently, at the first input terminal 54 of the gate 44, there will be a ground potential enabling signal applied from the flip flip 42. The positive-going leading edge of a pulse from the generator 48 activates the gate 44 and drives both the transistors 50 and 52 into saturation. The gate 44 inverts the input pulse and applies a negative-going pulse to the set terminal 36 of the flip flip 10. Simultaneously, the generator 48 applies a pulse to the inverter transistor 62. The transistor 62 saturates and applies a negative-going pulse to the reset terminal 38 of the flip flip 10. Consequently, negative-going set and reset pulses are applied simultaneously to the set and reset terminals 36 and 38, respectively, of the flip flip 10. Since the emitters of the transistors 62 and 52 are both coupled to the same negative potential terminal ($V_3$), the negative set and reset pulses are of the same amplitude.

The negative set pulse is coupled through the resistor 53 to forward bias the base-emitter junction of the first transistor 12 and drives this transistor into saturation. The saturation of the first transistor 12 raises the potential of the output terminal 40 from $V_1$ (−4.5 v.) to ground. Thus, the flip flip 10 is rapidly switched to a set condition when the leading edge of a set pulse is applied. It is to be noted that the setting of a flip flip is a very fast operation as contrasted to a flip flop wherein the cross coupling networks tend to slow the operation down.

The negative reset pulse applied to the base 22 of the second transistor 14 maintains this transistor cutoff even though the first transistor 12 is saturated. At the expiration of the set and reset pulses, the ground potential exhibited by the collector 20 of the first transistor 12 forward biases the base-emitter junction of the transistor 14 and drives this transistor into saturation.

Thus, the simultaneous application of set and reset pulses to the flip flip 10 causes the set pulse to dominate and turns on the flip flip 10 when it is initially nonconductive. An output signal of ground potential level is therefore produced at the output terminal 40 of the flip flip 10 and the flip flip 10 stores the binary "1" transferred thereto from the flip flip 42. The cross coupling and biasing circuits maintain the transistors 12 and 14 in the flip flip 10 set (saturated) state. The saturation of the first transistor 12 maintains the base 22 of the transistor 14 at a positive potential, forward biasing this transistor, while the saturation of the transistor 14 maintains the base 18 of the transistor 12 at a negative potential, forward biasing this transistor. Thus, the flip flip 10 is stably maintained in its set or conductive state.

While in its conductive state, the flip flip 10 dissipates slightly less power than a flip flop circuit operating in one of its stable states. The collector 26 current of the transistor 14 is limited by the resistors 30 and 34 to an amount sufficient to provide just enough base current to maintain the transistor 12 in saturation. The transistor 12 amplifies its base current by a factor of beta ($\beta$) to obtain the necessary power for driving other logic circuit elements fanning out therefrom. While in the reset state, a flip flip consumes no power at all. Thus, in the set state, a flip flip consumes an amount equivalent to a flip flop. Consequently, assuming both bistable circuits would be operating in one stable state for one-half its operating period, a flip flip utilizes only one-half the power of a flip flop.

In the following description, it will be assumed that the flip flip 42 is initially nonconductive or reset, while the flip flip 10 is conductive or set. Thus, a binary "0" is to be transferred from the flip flip 42 to the flip flip 10. The pulse applied from the generator 48 to the gate 44 under this condition will be blocked because no enabling signal is available from the flip flip 42 to activate this gate. Thus, no set pulse is applied to the set terminal 36 of the flip flip 10. The pulse from the generator 48, however, does saturate the inverter transistor 62 and a negative reset pulse is applied to the base 22 of the transistor 14. The negative reset pulse reverse biases the base-emitter junction of the transistor 14 and cuts off this transistor. The cutting off of the transistor 14 drives the base 16 of the first transistor 12 positively (i.e., to +1.5 v.) which reverse biases this base-emitter junction of the transistor 12. The transistor 12 therefore cuts off and the potential level of the output terminal 40 decreases from ground potential to the negative level of the source $V_1$ (−4.5 v.). This level denotes a binary "0" output from the flip flip 10. The biasing maintains the flip flip 10 nonconductive.

Thus, the information stored in the flip flip 42 is transferred to the flip flip 10. However, it is to be noted that the resetting of the flip flip 10 is a two-step operation in that the transistor 14 is cutoff first and the cutting off of this transistor cuts off the transistor 12. It is not until the transistor 12 cuts off that the set output signal from the terminal 40 of the flip flip 10 is removed. Therefore, in a set dominate mode of operation, the setting of a flip flip makes the output available at the first step of a two-step operation, while the resetting of the flip flip makes the output available at the second step of a two-step operation. The setting of the flip flip 10 is therefore a faster operation than the resetting thereof. This difference in operation permits set and reset pulses of equal duration, magnitude, etc., to be simultaneously applied to the flip flip 10 without confusion. No "race" condition enters into the operation. A reset pulse would have to be significantly wider than a set pulse to reset the flip flip 10 when it is actually desired to set it. Thus, should it be necessary, separate pulse sources producing substantially similar pulses may supply the set and reset pulses.

The operation of the circuit of FIGURE 1 in the final two conditions, i.e., transferring a "1" from the flip flip 42 into the flip flip 10 when the flip flip 10 is initially storing a "1," and transferring a "0" from the flip flip 42 into a flip flip 10 when the flip flip 10 is initially storing a "0," is obvious from the previous description. When both the flip flips 42 and 10 are storing "0's," the reset pulse maintains the flip flip 10 reset since no set pulse is passed by the gate 44. Similarly, when both the flip flips 42 and 10 are storing "1's," the set pulse predominates over the reset pulse and maintains the flip flip 10 in its set state.

The flip flip 10 therefore exhibits all of the desirable information transfer characteristics of a flip flop with the added advantages that faster setting operation is obtained and much less power is consumed. For example, the flip flips in a multi-stage register operating in a standby condition are literally turned off, whereas flip flops in a similar register would all be conducting. In addition to large power savings, heat dissipation problems are also minimized in large data transfer systems and this in turn reduces the chances of transistor failures. By substituting an opposite conductivity type transistor for each of the transistors 12 and 14 in the flip flip 10, positive set and reset pulses could be utilized.

In FIGURE 2, there is shown another embodiment of the invention in which a bistable flip flip circuit is operated in a reset dominate mode. In this embodiment of the invention, parts identical to those in FIGURE 1 are referenced with the same numbers but these numbers are primed. The reset terminal 38′ of the flip flip 10′ of FIGURE 2 is now coupled directly to the base 16′ of the first transistor 12′, while the set terminal 36′ is coupled to the collector 26′ of the second transistor 14′ and through the resistor 30′ to base 16′ of the first transistor 12′.

Pulses from the pulse generator 48′ are applied through a resistor 70 to the base of an inverter transistor 72. The emitter of the transistor 72 is coupled to the negative potential terminal $V_3$ (−3 volts), while the collector thereof is coupled directly to the set terminal 36′ of the flip flip 10′. A coincidence gate 74 includes a pair of NPN transistors 76 and 78 connected with their emitter-collector current paths in series. The emitter of the transistor 76 is connected directly to the negative potential terminal $V_3$ (−3 volts), while the collector of the transistor 78 is coupled through a pair of voltage dividing load resistors 80 and 82 to the positive potential terminal $V_2$ (+1.5 v.). The output of the gate 74 is derived from the junction 84 of the resistors 80 and 82 and is coupled to the base of a clamp transistor 86. The emitter of the transistor 86 is grounded while the collector thereof is connected directly to the reset terminal 38′ of the flip flip 10′. The output terminal (O) of the flip flip 42′ is connected to the base of the transistor 78 through a resistor 88, while the pulse generator 48′ is connected to the base of the transistor 76 through a resistor 90.

The logic circuit of FIGURE 2 transfers the inverse of the information stored in the flip flip 42′ to the flip flip 10′. In the following description, it will be assumed that both the flip flips 42′ and 10′ are set. The set terminal 36′ of the flip flip 10′ is at approximately the potential level of $V_3$ (−3 volts), the reset terminal 38′ is below ground, and the output terminal 40′ is at ground. The junction point 84 of the non-conducting gate 74 is at the potential level of $V_2$ (+1.5 volts).

The application of a pulse from the generator 48′ saturates the transistors 76 and 78 of the gate 74 and drives the junction point 84 negative. The transistor 86 saturates and drives the reset terminal 38′ positively to ground potential level. Simultaneously, the pulse output of the generator 48′ saturates the transistor 72 and inverts the input pulse. The set terminal 36′ is fixed at the potential level $V_3$ (−3 volts) by both the transistors 14′ and 72 and its potential level does not change. It is to be noted that in this embodiment of the invention opposite polarity set and reset pulses are utilized.

The positive reset pulse applied to the reset terminal 38′ cuts off the transistor 12′. The potential level of the output terminal 40′ drops to the $V_1$ level (−4.5 volts) and the flip flip 10′ produces a binary "0" output. The transistor 14′ is in turn cutoff by the increase in potential at the base 22′ thereof. Thus, the inverse of the information stored in the flip flip 42′ has been transferred to flip flip 10′ and stored therein. Thus, in this embodiment of the invention, the transistor 12′ cuts off first which in turn cuts off the transistor 14′.

When neither the flip flip 42′ nor the flip flip 10′ is conducting, the binary "0" stored in the flip-flip 42′ is transferred to the flip flip 10′ in inverse form and causes the output of the flip flip 10′ to exhibit a binary "1." Under this condition, the gate 74 is not activated since there is no signal output from the flip flip 42′. However, the negative-going pulse applied from the inverter transistor 72 drives both the set terminal 36′ and reset terminal 38′ negatively. The base-emitter junction of the first transistor 12′ is therefore forward biased and this transistor saturates. The output terminal 40′ rises to ground potential level which in turn causes the transistor 14′ to saturate. The output terminal 40′ therefore produces a binary "1" signal level. Thus, a binary "0" stored in the flip flip 42′ has been transferred to the flip flip 10′ in inverse form.

When the flip flip 42′ is initially reset and the flip flip 10′ is initially set, the flip flip 10′ does not change state upon the application of a pulse from the generator 48′. The dominant reset pulse is blocked by the nonconductive gate 74 and the applied set pulse maintains both transistors 12′ and 14′ saturated. Similarly, when the flip flip 42′ is initially set and the flip flip 10′ is initially reset, the flip flip 10′ remains reset upon the application of a pulse from the generator 48′. The nondominant set pulse drives the set terminal 36′ negatively to the $V_3$ potential level (−3 volts) but the dominant reset pulse saturates the transistor 86 and clamps the reset terminal 38′ to ground. Therefore, the transistor 12′ does not become forward biased and remains off. Thus, both transistors remain off or reset.

The logic circuit of FIGURE 2 therefore transfers the inverse of the information from one flip flip to another flip flip by utilizing a reset dominate technique.

Thus, a bistable transistor flip flip is provided which, in one embodiment thereof, not only duplicates the logical operation of a flip flip but does so in less time and consumes half the power of a flip flop in normal operation. In another embodiment of the invention, the logical operation of a flip flop is duplicated but in inverse form and with the same saving of power.

The following is a list of components utilized in FIGURE 1 for worst case conditions over a temperature range extending from −55° C. to +125° C.:

Transistor 12—2N995
Transistor 14—2N2206
Transistor 50—2N2206
Transistor 52—2N2206
Transistor 62—2N2206
Resistor 28—2.2K
Resistor 30—820 ohms
Resistor 32—1K
Resistor 34—2.2K
Resistor 53—430 ohms
Resistor 56—3.3K
Resistor 60—3.3K
Resistor 64—3.3K

What is claimed is:

1. A logic circuit comprising the combination of, a bistable flip flip including a pair of cross-coupled transistors of opposite conductivity type and exhibiting a conducting stable state and a nonconducting stable state, means providing a dominant input terminal and a nondominant input terminal for said bistable flip flip so that an input signal applied to said dominant input terminal causes said flip flip to operate in one stable state and an input signal applied to said nondominant terminal causes said flip flip to operate in the other stable state, a coincidence gate coupled to said dominant terminal, means for applying a binary input signal to said gate, and means for applying a second input signal both to said nondominant terminal and to said gate simultaneously with the application of said binary input signal to said gate, to cause said bistable flip flip to operate in one of said stable states when said binary signal is at one binary level and is gated to said dominant terminal and to operate in the other of said stable states when said binary signal is at the other binary level and blocked by said gate.

2. A logic circuit having a conducting stable state and a nonconducting stable state comprising in combination, first and second transistors of opposite conductivity with each of said transistors including input, output and common electrodes, means for cross coupling the output electrode of said first transistor to the input electrode of said second transistor and the output electrode of said second transistor to the input electrode of said first transistor to provide current feedback to cause both of said transistors to operate in the same state, means adapting said first and second transistors to be biased to a normally nonconductive state, dominant and nondominant input terminals coupled to said first and second transistors so that a binary input signal applied to said dominant terminal causes said logic circuit to operate in one of said stable states and a second input signal applied to said nondominant input terminal causes said logic circuit to operate in the other stable state, a coincidence gate having an output terminal coupled to said dominant terminal, means for applying said binary input signal to said gate, and means for applying said second input signal both to said gate and said nondominant terminal simultaneously with the application of said binary input signal to said gate to cause said logic circuit to operate in said one stable state when said binary input signal is at one binary level and is gated through said coincidence gate to said dominant terminal, and to operate in said other stable state when said binary input signal is at the other binary level and is blocked by said coincidence gate.

3. A set dominate bistable flip flip circuit having a conducting set state and a nonconducting reset state comprising the combination of, first and second transistors of opposite conductivity types with each including input, output, and common electrodes, means for cross coupling said transistors by connecting the input electrode of each transistor to the output electrode of the other transistor to provide current feedback to cause both of said transistors to operate in the same stable state, means adapting said transistors to be biased to operate in a normally nonconducting state, a dominant set terminal coupled to the input electrode of said first transistor, a nondominant reset terminal coupled to the input electrode of said second transistor, a coincidence gate having an output terminal coupled to said dominant set terminal, means for applying a set signal to said gate, and means for simultaneously applying a reset signal to both said gate and to said nondominant reset terminal so that the simultaneous application of said set and reset signals to said coincidence gate actuates said dominant set terminal to forward bias said first transistor to conduction whereas said reset signal reverse biases to cut off said second transistor, and at the expiration of said reset signal said first transistor forward biases said second transistor to conduction.

4. A reset dominate bistable flip flip circuit having a conducting set state and a nonconducting reset state comprising the combination of, first and second transistors of opposite conductivity types with each including input, output, and common electrodes, a cross coupling network including, a first resistor coupling the output electrode of said second transistor to the input electrode of said first transistor, and a second resistor coupling the output electrode of said first transistor to the input electrode of said second transistor, said cross coupling network providing current feedback to cause both of said transistors to operate in the same stable state, means for biasing said transistors to operate in a normally nonconducting state, a dominant reset terminal coupled to the input electrode of said first transistor, a nondominant set terminal coupled to the output electrode of said second transistor, a coincidence gate coupled to said dominant reset terminal, means for applying a set signal unconditionally to said nondominant terminal, and means for simultaneously applying set and reset signals to said coincidence gate to activate said dominant terminal to cause said bistable circuit to operate in said nonconducting reset stable state.

5. A logic circuit comprising the combination of, a reset dominate bistable flip flip circuit exhibiting a conducting set state and a nonconducting reset state, means providing a dominant reset terminal and a nondominant set terminal for said bistable flip flip, a coincidence gate having an output terminal coupled to said dominant reset terminal, a bistable flip flip exhibiting a conducting set state and a nonconducting reset state and having an output terminal coupled to one input of said gate to provide an enabling signal when nonconducting, and means for simultaneously applying pulses to the other input of said gate and to said nondominant set terminal so that said reset dominate bistable flip flip is reset to a nonconducting state when said gate passes a pulse to said dominant reset terminal and set to a conducting state when said gate blocks said dominant reset terminal, whereby said reset dominate bistable flip flip assumes a stable state opposite to the state of said bistable flip flip.

References Cited by the Examiner

UNITED STATES PATENTS

| | | | |
|---|---|---|---|
| 3,054,907 | 9/1962 | Payton et al. | 307—88.5 |
| 3,170,075 | 2/1965 | Mellott | 307—88.5 |

ARTHUR GAUSS, *Primary Examiner.*

S. D. MILLER, *Assistant Examiner.*